United States Patent [19]

Bronsveld

[11] 4,287,983
[45] Sep. 8, 1981

[54] CONVEYORS HAVING A PLURALITY OF DRIVEN ENDLESS CHAINS

[75] Inventor: Frederik A. Bronsveld, Ijmuiden, Netherlands

[73] Assignee: Hoogovens Ijmuiden, B.V., Ijmuiden, Netherlands

[21] Appl. No.: 48,809

[22] Filed: Jun. 15, 1979

[30] Foreign Application Priority Data

Jun. 21, 1978 [NL] Netherlands .................. 7806685

[51] Int. Cl.³ .................. B65G 15/10; B65G 21/00
[52] U.S. Cl. .................. 198/817; 198/838; 198/860
[58] Field of Search .............. 198/817, 837, 838, 862, 198/860

[56] References Cited

U.S. PATENT DOCUMENTS

| 2,769,522 | 11/1956 | Pfeiffer | 198/847 X |
|---|---|---|---|
| 3,024,888 | 3/1962 | Lasmier | 198/462 |
| 3,116,824 | 1/1964 | Stram | 198/817 |
| 3,314,526 | 4/1967 | Franek et al. | 198/838 |
| 3,835,982 | 9/1974 | Zappia | 198/862 X |
| 3,918,574 | 11/1975 | Allison | 198/854 X |

FOREIGN PATENT DOCUMENTS

| 827319 | 12/1951 | Fed. Rep. of Germany | 198/817 |
|---|---|---|---|
| 1057533 | 5/1959 | Fed. Rep. of Germany | 198/457 |
| 1559270 | 3/1969 | France | 198/437 |
| 214173 | 4/1924 | United Kingdom | 198/817 |

Primary Examiner—Robert B. Reeves
Assistant Examiner—Douglas D. Watts
Attorney, Agent, or Firm—Stevens, Davis, Miller & Mosher

[57] ABSTRACT

In a chain conveyor having a plurality of side-by-side endless chains which support articles being conveyed and are driven by engagement with sprocket wheels on common driving shafts, the chains are rendered individually and independently removable and replaceable by mounting them on a cassette. The cassette comprises a frame which provides a track for the rollers of the chain and supports the sprocket wheels in bearings. Thus the sprocket wheels are not supported by the drive shafts, which are axially withdrawn to allow removal of a cassette.

4 Claims, 6 Drawing Figures

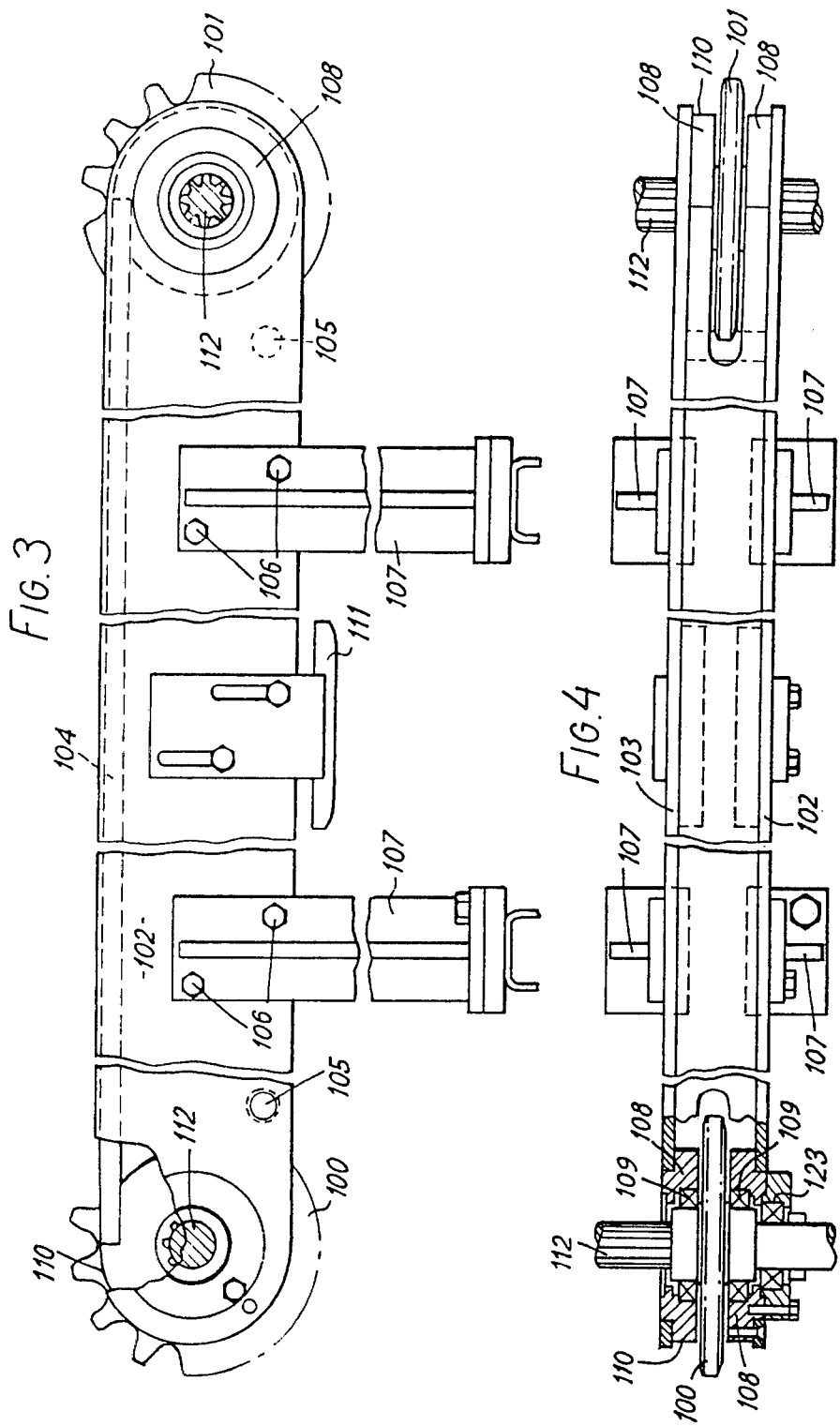

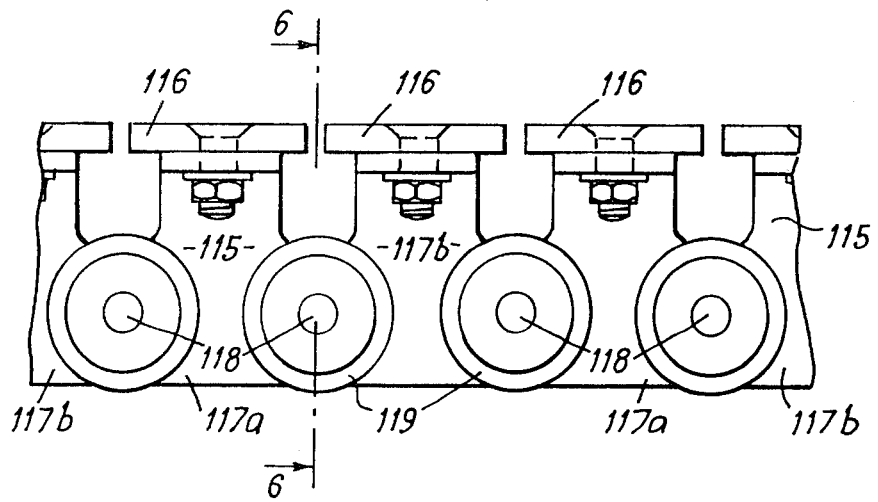
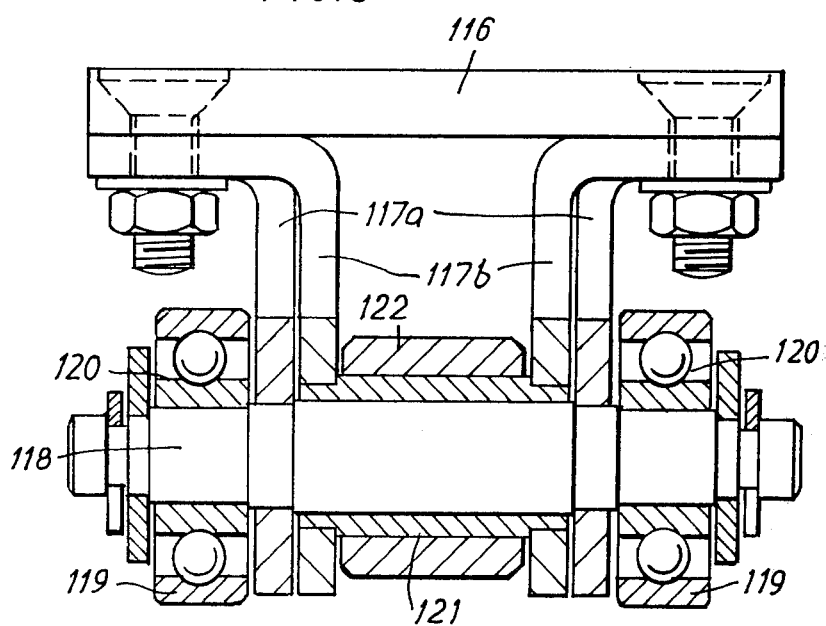

CONVEYORS HAVING A PLURALITY OF DRIVEN ENDLESS CHAINS

BACKGROUND OF THE INVENTION

1. Field of the Invention

This invention relates to conveyors having a plurality of endless chains arranged side-by-side and driven around parallel paths having upper and lower runs, the upper runs providing the support for articles being conveyed. The invention also relates to a composite conveyor composed of at least two such conveyors arranged end-to-end.

2. Description of the Prior Art

In conveyors of the above type conventionally the chains are composed of elements having rollers which run along a roller track at the upper run. At the turning points at the ends of the upper run, sprocket wheels engage the chain elements. The sprocket wheels of the several chains are arranged coaxially at each end of the conveyor and conventionally are mounted on a common shaft.

Such conveyors are frequently used in many fields, e.g. the steel industry. Carrier plates may be mounted across the chains. The rollers are often hardened because of the loads which occur. Short conveyors are usually driven by electric motors through reduction gearing and the sprocket wheels. Rotary drive naturally provides the advantage of smoothness, but this is limited, in dependence on the load, the speed and the number of teeth on the drive wheel, by the so-called polygon effect. This effect arises out of the polygonal construction of the sprocket wheel: as a link of the chain runs in and out of the wheel, the chain is accelerated and retarded, thus causing the speed to fluctuate. This uneven running brings about jerky speed variations, which in practice are at least to some extent cancelled out both by the elasticity of the chains and wheels and by angular speed fluctuations. Stretching in the whole of the chain caused by the forces produced and play can be considerable and is often taken up by means of a tensioning device.

Play occurs in the drive linkage between the electric motor and the load to be transported and, over the course of time, increases as a result of wear and of the plastic deformation of components. If no additional measures are taken the electric motor will first overcome any play in the drive linkage when the chain conveyor is started before the load begins to move. During this starting phase, the motor speed may become considerable, together with the associated kinetic energy. As soon as all the play has been taken up, this kinetic energy is converted into a shock on the load, which is undesirable when the load consists of a stack of tinplates or of other material which would be adversely affected by this shock.

Components such as rails, chain wheels, etc. which are prone to wear should desirably be fitted in such a way that they are easily changed, but this has not generally been a consideration in design. In some conventional designs, the chain wheels are made up of segments which can be changed without dismantling the chain.

Transferring the load between chain conveyors which are in line with one another is not simple, and for this reason, a long continuous conveyor, with associated problems, is often preferred.

Illustrative of the prior art are U.S. Pat. Nos. 2,769,522, 3,024,888, 3,116,824 and 3,918,574 and U.K. Pat. specification No. 214,173. U.S. Pat. Nos. 2,769,522 and 3,918,574 and U.K. Pat. No. 214,173 need not be discussed. U.S. Pat. No. 3,024,888 shows the two sets of sprocket wheels at the junction of two chain conveyors mounted on a common drive shaft, one set being keyed to the shaft so as to be driven while the other set is idling on the shaft. The shafts are supported in a frame, and carry the chains. Odd and even numbers of chains alternate along the composite conveyor. U.S. Pat. No. 3,116,824 illustrates a similar arrangement, though here each conveyor section has two chains. Adjacent frame portions carrying shafts supporting the chains are rigidly linked by plates carrying the drive shafts.

SUMMARY OF THE INVENTION

The principal object of the present invention is to provide a chain conveyor in which the removal and replacement of parts is rendered very simple and requires very little time.

Another object of the invention is to provide a chain conveyor which is easily assembled end-to-end with other like conveyors into a composite conveyor in which transfer of articles from one conveyor to the next does not present problems.

Another object of the invention is to minimize or eliminate jerky movements of the conveyor, and in particular shocks caused at start-up.

The invention is characterised in that each chain is mounted on a cassette, the respective cassettes being individually and independently removable from the conveyor for repair or replacement, each cassette having an elongate frame providing the roller track and carrying bearing supporting the sprocket wheels at the ends of the conveyor. The sprocket wheels of the respective cassettes at one end of the conveyor are drivingly engaged by a common drive shaft located at the common axis of the sprocket wheels at that end of the conveyor, while the sprocket wheels at the other end of the conveyor are freely rotatable.

The cassette principle of construction of the conveyor is particularly effective in making removal and replacement of parts quick and easy. For instance, removal of the cassette may be possible after only withdrawal of the driving shaft and removal of a few bolts. It will be noted that the sprocket wheels are journalled in the cassette frame and not on the drive shaft, so that removal of the drive shaft is especially easy, particularly if as is preferred the drive shaft is a splined shaft which can be arranged to have very low play relative to the sprocket wheels. The driving shaft itself need have no bearing in the region of the chains of the conveyor.

At the non-driving end of the conveyor, the sprocket wheels are freely rotatable and are not borne on a shaft though a shaft may pass through their centre holes. This makes interdigitation of the conveyor chains with the chains of the next conveyor in a composite conveyor easy. Assembly and disassembly of the two conveyors from each other may require only the insertion and removal of the drive shaft at their common sprocket wheel axis. Interdigitation means that continuous support of articles being conveyed is provided, while the invention permits the adjacent conveyors to be driven independently.

The cassette principle allow relatively complex composite conveyors to be constructed, e.g. one in which the conveyor sections alternately have five and four parallel chains.

In order to minimize play between the drive motor and the chains, the driving shaft is preferably directly connected without play to the shaft of a DC electric motor. Accurate control of a DC motor to achieve the desired smooth acceleration avoiding jerks and the desired accuracy of speed is possible.

In order to reduce wear on the sprocket wheels, it is preferred that the said roller track extends adjacent each sprocket wheel, so at this region the load of the chain is transferred to the frame via the rollers and not via the sprocket wheels, which thus serve to provide driving torque only.

BRIEF DESCRIPTION OF THE DRAWINGS

The preferred embodiment of the invention will now be described by way of non-limitative example with reference to the accompanying drawings, in which:

FIG. 3 is a side view of a cassette of one of the conveyors of the composite conveyor of FIG. 1;

FIG. 4 is a plan view, partly in axial section through the sprocket wheels, of the cassette of FIG. 3;

FIG. 5 is a side view of three of the elements of the endless chain of the cassette of FIG. 3; and FIG. 6 is a section on the line 6—6 of FIG. 5.

DESCRIPTION OF THE PREFERRED EMBODIMENT

Figure 1:
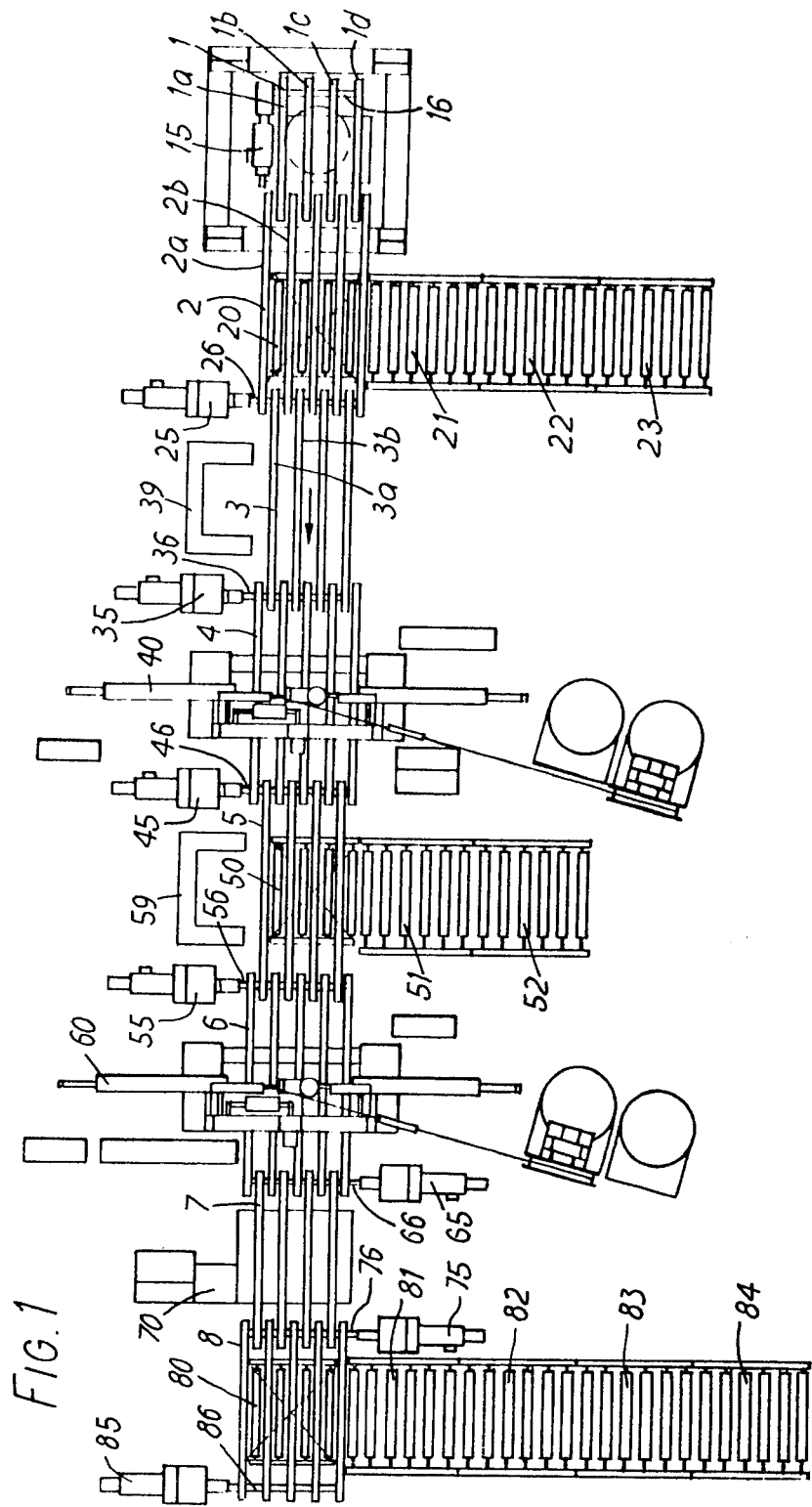
FIG. 1 is a plan view of a composite conveyor of the invention and associated apparatus forming part of a packaging line for stacks of tinplate sheet.
Figure 2:
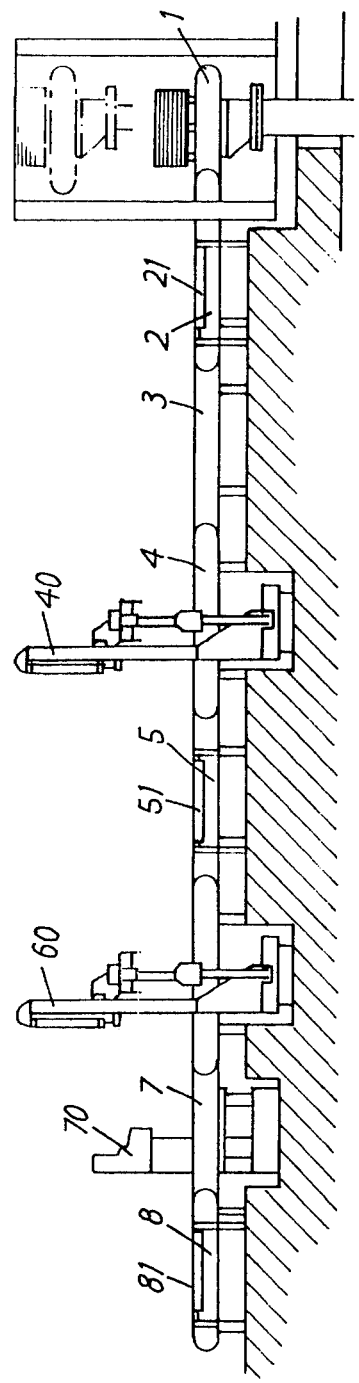
FIG. 2 is a side view of the composite conveyor of FIG. 1.

To illustrate the advantages of the use of the chain conveyor of the invention, its application in the large composite conveyor shown in FIGS. 1 and 2 will be described. This composite conveyor is the main conveyor of a packaging line arranged after the shears and sorting apparatus (not illustrated) of a tinning line for steel strip. Flow of stacks is from right to left in both Figures, as indicated by arrows.

The composite conveyor consists of eight chain conveyors 1 to 8 arranged end-to-end and overlapping in a straight line; the conveyors 1,3,5 and 7 each have four parallel endless chains (1a,1b,1c,1d,3a,3b etc.) and the conveyors 2,4,6 and 8 each have five endless chains (2a,2b etc.). The conveyors 2 to 6 are all of the same length, this facilitating manufacture, maintenance and repair, since parts are interchangeable between them.

The conveyors 1 to 8 are individually and independently driven by DC electric motors 15,25,35, etc. In each case (except conveyor 1) these motors have drive shafts 16,26,36 etc. at the forward end of the conveyor, i.e. the end reached later by a stack moving along the composite conveyor. As explained in more detail below, the shafts 26,36 etc. extend through the sprocket wheels of all the interdigitating chains at the overlapping ends of the adjacent pairs of conveyors, but only drive the sprocket wheels of one conveyor of the pair.

The functions performed at each of the conveyors 1 to 8 during packaging of stacks of tinplate sheets will be described briefly. Conveyor 1 is liftable and rotatable through 90° about a vertical axis. A wooden pallet is placed on it, with the runners of the pallet transverse to the chains 1a, 1b etc. and a stack of sheets is formed on the pallet. Rotation of the conveyor 1 allows the sheets to be stacked in whichever of the two orientations on the pallet relative to the runners is desired by end users of the sheets. When the stack is complete, the conveyor 1 is brought to the position shown in FIGS. 1 and 2 so that the stack can be transferred to conveyor 2.

Conveyor 2 has a lifting roller conveyor 20 with its roller raisable between the chains 2a, 2b etc. for take-out or take-in of stacks to or from a branch roller conveyor 21,22,23.

At conveyor 3 manual partial packing of the stack is performed, aided by mechanical means 39. At conveyor 4 there is an automatic strapping machine 40, which applies steel straps around the stack and the pallet between the runners of the pallet.

At conveyors 5 and 6 are a further manual packing station with packing aid 50 and a further strapping machine 60 respectively. At conveyor 5 optional lifting and branch roller conveyors 50,51,52 are also provided, to take out stacks e.g. in the event of breakdown.

Conveyor 7 is a weighing conveyor, with a weighing machine 70. At conveyor 8, the packed and weighed stacks are transferred by a lifting roller conveyor 80 to a take-out roller conveyor line 81,82, 83,84 from which the stacks are removed e.g. by fork lift truck.

Each endless chain of each of the conveyors 1 to 8 is generally mounted as a cassette unit independently of the other chains in the same conveyor, except for the common shafts at each end. The chains are thus independently and individually removable, each as a unit. The construction of one such chain and its cassette will now be described with reference to FIGS. 3 to 6, and this description will serve for all the chains of all the chain conveyors 1 to 8.

The endless chain is not shown in FIGS. 3 and 4 but can be visualized running around the two sprocket wheels 100,101 at each end. The unitary cassette carrying the chain has a frame composed of side plates 102,103, a top plate 104 which provides part of the track for the rollers of the chain and bottom cross-members 105. This frame is mounted in the desired location by removable bolts 106 on vertical members 107, at each side. Withdrawal of the drive shafts from the wheels 100,101 and removal of the bolts 106 allows the whole cassette with its chain to be removed.

Mounted on the ends of the side plates 102,103 at each end of the cassette are two annular blocks 108 with central apertures which provide bearing surfaces for bearings 109 carrying the sprocket wheels 100,101 which also have central apertures. The outer surfaces 110 of the blocks 108 also form part of the track for the rollers of the chain, and join smoothly into the top surface of the top plate 104.

Centrally of the side plates 102,103 is adjustably suspended a chamfered plate 111 (FIG. 3) which lies adjacent the lower run of the chain and prevents excessive play in the chain, e.g. when the drive direction reverses. Tension is normally maintained by the weight of the chain (in this embodiment about 100 kg/m) but conventional tensioning means may be provided if desired.

FIG. 3 shows that the drive shafts 112 are both splined. The sprocket wheel 100 at one end is complementarily splined and meshes with the drive shaft 112 to be driven thereby so as to move the chain. The centre hole of the wheel 101 on the other hand is larger than the shaft 112 (e.g. by 0.02 mm) at that end and is not splined, i.e. the wheel 101 is idling on this shaft, whose function of course is to drive the sprocket wheels of the next adjacent conveyor. Neither of the sprocket wheels 100,101 is supported by the shafts 112 and the wheel 101 does not even engage the shaft.

The endless chain is composed of elements 115 shown in FIGS. 5 and 6. Each element 115 comprises a load-supporting tread 116 and two side plates 117a, b. Adjacent side plates 117a and 117b on either side of the chain are relatively offset as FIG. 6 shows, so that they overlap where they are mounted on shafts 118 which carry the rollers 119 by means of bearings 120. The side plates 117a directly engage the shaft 118 but the side plates 117b engage a sleeve 121 slidable around the shaft so that the two adjacent elements 115 can pivot relatively as they pass around the sprocket wheels 100,101. A further sleeve 122 on the sleeve 121 is engaged by the teeth of the sprocket wheel 100, 101 in order to drive the chain.

The rollers 119 roll on the roller track provided by the plate 104 and blocks 108. Thus the sprocket wheels 100,101 do not take the weight of the chain and the load it is carrying but only transmit driving force to the elements 115. This minimizes wear.

If desired for extra support, the shaft 112 may be journalled by a bearing 123 in the cassette (see FIG. 4) but preferably this feature is omitted, or if provided, the bearing 123 is readily detachable from the cassette e.g. as illustrated.

The shafts 112 are directly attached to the shafts of their DC drive motors, so that play is avoided. The amount of play in the spline connection to the sprocket wheel can be minimal. The plate 111 can ensure that slack in the chain is minimal. In this way, minimal play in the whole chain conveyor is achieved, so that the drive motor can set the whole conveyor in motion virtually simultaneously. This minimizes starting jerks and jerky running, which is advantageous with tinplate stacks, the sheets of which are liable to damage if the stack is jerked so that they slide one over another. The starting-up time of the drive motor can be for example 0.1 to 0.5 seconds and is preferably adjustable.

What is claimed is:

1. In a conveyor having a plurality of endless chains arranged side-by-side and each being driven around a path having an upper and a lower run, the upper runs supporting and displacing articles being conveyed on the conveyor, each chain being composed of elements running on rollers along a roller track and there being sprocket wheels engaging the chain at each end of the upper and lower runs, the sprocket wheels of the respective chains being arranged coaxially at each end of the conveyor, a shaft passing through the sprockets at each end of the conveyor, the improvement that each said chain is mounted on a cassette, the respective cassettes being individually and independently removable from the conveyor for repair or replacement, each cassette having an elongate frame providing said roller track and carrying bearings supporting said sprocket wheels at the ends of the conveyor a fixed distance apart, said upper runs supporting and displacing articles being conveyed on the conveyor being supported only by said roller track, the sprocket wheels of the respective cassettes at one end of the conveyor being drivingly engaged by one said shaft acting as a drive shaft while the sprocket wheels at the other end of the conveyor are freely rotatable about another said shaft, said shafts being splined, said sprockets at one end of said conveyor having splined holes therethrough cooperating with said splined shaft and a D.C. electric motor directly driving and splined sprockets through said splined shaft.

2. A conveyor according to claim 1 wherein the said roller track extends adjacent each sprocket wheel, so that the load of the chain is transferred to the frame via the rollers and not via the sprocket wheels, which thus serve to provide driving torque only.

3. A composite conveyor composed of at least two chain conveyors according to claim 1 arranged end-to-end overlappingly, with the chains of one chain conveyor interdigitating with the chains of the other chain conveyor and the sprocket wheels of both conveyors at the overlapping ends arranged on said drive shaft which drivingly engages the sprocket wheels of one of the conveyors while the sprocket wheels of the other conveyor are freely rotatable relative to the shaft.

4. A conveyor comprising
   (a) a plurality of endless chains each composed of a plurality of elements articulatedly connected together, the chains being arranged parallel to each other side-by-side each with an upper run extending in the conveying direction, and a lower run, the chain elements at the said upper run providing support surfaces for articles being conveyed, and the chain elements having rollers,
   (b) a plurality of cassettes on which said endless chains are respectively mounted, each cassette comprising
      (i) an elongate frame extending longitudinally in the conveying direction and having opposite longitudinal ends,
      (ii) a roller track on said frame on which said rollers of said chain elements run when the elements are at the upper run of the chain, said rollers of said chain elements providing support surfaces for articles being conveyed on said upper run being supported only by said roller track,
      (iii) a pair of sprocket wheels engaging the chain elements, one of said sprockets having a splined hole, and
      (iv) bearing means rotatably mounting the said sprocket wheels respectively at each end of the frame
   (c) mounting means mounting said cassettes in side-by-side relation and permitting each cassette together with the chain mounted on it to be individually removed from the conveyor independently of the other cassettes, the sprocket wheels at each end respectively of the respective cassette frames being coaxially aligned, and
   (d) a first splined drive shaft extending through and drivingly engaging said splined hole sprocket wheels at one end of the cassette frames, a second splined drive shaft extending through the sprocket wheels at the other end of the cassette frames, the sprocket wheels at the other end of the cassette frames being freely rotatable on said second splined shaft.

* * * * *